(12) United States Patent
Piasecki et al.

(10) Patent No.: US 7,823,827 B2
(45) Date of Patent: Nov. 2, 2010

(54) VECTORED THRUSTER AUGMENTED AIRCRAFT

(76) Inventors: Frederick W. Piasecki, 1 Buck La., Haverford, PA (US) 19041; Frank N. Piasecki, Tunbridge Rd. and Andover Rd., Haverford, PA (US) 19041

( * ) Notice: Subject to any disclaimer, the term of this patent is extended or adjusted under 35 U.S.C. 154(b) by 646 days.

(21) Appl. No.: 11/782,353

(22) Filed: Jul. 24, 2007

(65) Prior Publication Data

US 2009/0014580 A1    Jan. 15, 2009

Related U.S. Application Data

(63) Continuation-in-part of application No. 11/776,385, filed on Jul. 11, 2007, now abandoned.

(51) Int. Cl.
*B64C 27/82*    (2006.01)
*B64C 27/08*    (2006.01)
*B64C 27/52*    (2006.01)

(52) U.S. Cl. .................... 244/17.19; 244/17.23; 244/56

(58) Field of Classification Search ................ 244/12.3, 244/6, 17.11, 17.19, 17.23, 17.25, 23 A, 23 B, 244/56; 701/3

See application file for complete search history.

(56) References Cited

U.S. PATENT DOCUMENTS

| 5,277,381 | A  | * | 1/1994 | Piasecki ................. | 244/17.19 |
| 2007/0221780 | A1 | * | 9/2007 | Builta ...................... | 244/7 R |
| 2009/0014580 | A1 | * | 1/2009 | Piasecki et al. ........... | 244/17.19 |
| 2009/0216392 | A1 | * | 8/2009 | Piasecki et al. ................ | 701/3 |

* cited by examiner

*Primary Examiner*—Timothy D Collins
*Assistant Examiner*—Joseph W Sanderson
(74) *Attorney, Agent, or Firm*—Lipton, Weinberger & Husick; Robert J. Yarbrough

(57) ABSTRACT

The Invention is a rotary-wing aircraft having at least two vectored thrusters that may be tilted from a horizontal to a vertical position and to positions intermediate between the horizontal and vertical positions. The two vectored thrusters are equipped with propellers having separately variable pitch. The two vectored thrusters also are equipped with vanes having selectable vane angles to direct separately the air flow from the two vectored thrusters. A control system detects the flight condition of the aircraft and selects vectored thruster control settings corresponding to the detected flight condition and consistent with predetermined control rules to provide lift, thrust, yaw moments and roll moments.

20 Claims, 14 Drawing Sheets

VECTORED THRUSTER AUGMENTED AIRCRAFT

CROSS REFERENCE TO RELATED APPLICATION

This is a continuation-in-part application based upon U.S. Patent Application entitled Vectored Thruster Augmented Aircraft, application Ser. No. 11/776,385, filed on Jul. 11, 2007.

I. BACKGROUND OF THE INVENTION

A. Field of the Invention

The Invention is a rotary wing aircraft featuring two or more laterally spaced-apart vectored thrusters that may be tilted between a first and a second position. The vectored thrusters may be equipped with adjustable horizontal vanes to direct selectably the flow of air from the vectored thrusters. The vectored thrusters also may be equipped with controllable-pitch propellers to selectably control the amount of thrust generated by each vectored thruster. The vectored thrusters, vanes and controllable-pitch propellers can be configured selectably to provide additional lift and to allow the rotary wing aircraft to reach higher ultimate speeds. The vectored thrusters, vanes and controllable pitch propellers also provide increased control power. A rotary wing aircraft equipped with the vectored thrusters, vanes and controllable pitch propellers of the Invention can be configured as part of an aircraft control system to provide greater control moments in roll and yaw than a rotary wing aircraft that does not include vectored thrusters, vanes and controllable pitch propellers. The Invention also may be applied to a compound aircraft.

B. Description of the Related Art

A conventional helicopter is a rotary wing aircraft including at least one main rotor and a means to overcome the torque response of the rotor. A compound aircraft includes all of the elements of a helicopter and also includes elements of a fixed-wing aircraft, such as a wing. As used in this document, the term "rotary wing aircraft" means a helicopter or compound aircraft.

The forward speed of a rotary wing aircraft is limited by advancing blade compression effects and retreating blade stall. A rotary wing aircraft may be equipped with an additional thrust mechanism, such as a propeller in a ducted fan, referred to herein as a "thruster." A conventional thruster may provide additional forward thrust to the rotary wing aircraft. The additional forward thrust may allow the rotary wing aircraft to reach higher ultimate speeds by postponing advancing blade compression effects and retreating blade stall. The additional forward thrust also may allow the aircraft to achieve lower fuel consumption and increased range. The use of a thruster can complicate the operation of the rotary wing aircraft in hover. To successfully hover, a rotary wing aircraft utilizing a thruster must be able to eliminate the effects of the forward thrust provided by the thruster.

The pilot of a conventional helicopter has only limited controls. The controls available for a conventional helicopter having a single main rotor and a tail rotor are:

Throttle—The pilot can control the amount of power supplied to the rotor blades and to the tail rotor.

Collective pitch—The pilot contemporaneously can change the pitch of all main rotor blades by an equal amount using the collective pitch control, also known as the 'collective.' Contemporaneously changing the pitch angle of all main rotor blades increases or decreases the lift supporting the helicopter. Increasing the collective and the power will cause the helicopter to rise. Decreasing the collective and the power will call the helicopter to descend.

Cyclic pitch—The pilot may use the cyclic pitch control, also known as the 'cyclic,' to cause the pitch angle of the main rotor blades to change differentially as the main rotor rotates through 360 degrees. The cyclic pitch control is used to control the pitch and roll of the helicopter. For example, increasing the pitch angle of a rotor blade when the rotor blade is retreating toward the rear of the helicopter and decreasing the pitch angle when the rotor blade is advancing toward the front of the helicopter will cause the main rotor plane of rotation to tilt forward and hence will cause the helicopter to move forward.

Yaw control—For a conventional helicopter having a tail rotor mounted on a boom, a pedal-operated yaw control changes the pitch of the tail rotor blades so that the tail rotor presents more or less force countering the torque response of the rotating main rotor. The pitch of the tail rotor blades therefore controls the yaw of the conventional helicopter having a tail rotor.

A conventional tandem-rotor helicopter, for example the Boeing CH47 Chinook, is equipped with two rotors and dispenses with a tail rotor. The pilot of a tandem-rotor helicopter operates controls identical to those of a single-rotor helicopter. The tandem-rotor helicopter achieves control equivalent to that of a single-rotor helicopter by applying either uniform or differential cyclic and collective pitch to each of the tandem rotors.

For either a single rotor or tandem rotor conventional helicopter and for a particular throttle setting, there is only one combination of trim control settings for the collective, cyclic and yaw controls to achieve any particular desired trimmed condition of the helicopter. The pilot of the conventional helicopter therefore has few control options.

It is desirable to provide a conventional helicopter with the benefits of thrusters to improve speed, range and fuel economy while retaining the benefits of the rotor in hover and low speed operation. It is also desirable to provide a conventional helicopter with increased control moments for yaw, pitch and roll. The prior art does not teach the apparatus of the Invention.

II. SUMMARY OF THE INVENTION

The Invention is a rotary wing aircraft having at least two vectored thrusters, which are ducted fans equipped with differentially controllable pitch propellers and differentially controllable horizontal vanes. The two vectored thrusters are located on opposing sides of the aircraft and are configured to be selectably tilted approximately 90 degrees between a first position and a second position.

When the two thrusters are in the first position, the axes of rotation of the thruster propellers are generally parallel to the longitudinal axis of the rotary wing aircraft and the exhaust of the two vectored thrusters is directed to the rear of the aircraft. In this configuration, the vectored thrusters provide forward thrust during forward acceleration and during coordinated flight. The forward thrust of the vectored thrusters allows the helicopter to realize the benefits of greater acceleration, speed, range, and fuel economy compared to a helicopter without vectored thrusters. In this configuration, the differentially controllable pitch of the propellers provides increased yaw control by selectably applying yaw moments to the aircraft. The differentially controllable horizontal vanes provide increased roll control by selectably applying roll moments to the aircraft.

When the two vectored thrusters are in the second position, the axes of rotation of the thruster propellers are generally vertical and the exhaust of the two vectored thrusters is directed generally downward. When in the second position, the two vectored thrusters do not apply a force to the helicopter in the forward direction and provide additional lift to the aircraft in slow speed or hovering flight. In this configuration, the differentially controllable pitch of the propellers provides increased roll control by selectably applying roll moments to the aircraft. The differentially controllable horizontal vanes provide increased yaw control by applying yaw moments to the aircraft. The tilt of the vectored thrusters, the propeller pitch and the horizontal vane position are selectable and are controlled by the pilot and the flight control system.

The tilt of the vectored thrusters may be selected to be intermediate between the horizontal and vertical directions. An intermediate tilt may be selected, for example, during forward acceleration to maintain air flow through the vectored thrusters and maximize lift generated by the vectored thrusters.

The axis of rotation of the vector thruster propellers is described above as being "generally" vertical and the exhaust of the vectored thrusters is described as being directed "generally" downward when in the second position because mechanical considerations for a particular application, such as the Boeing CH-47 Chinook helicopter, may provide that the propeller axes of rotation when in the second position are not parallel and will intersect below the helicopter when projected on a front or rear view. The purpose of the non-parallel propeller axes for the CH-47 Chinook is to prevent the drive systems for the two vectored thrusters from occupying excessive interior space in the helicopter.

The thruster propellers have a differentially variable pitch. The differentially variable pitch allows additional control options for the pilot and control system. For example, when the vectored thrusters are oriented in the generally vertical direction, the pitch of the propeller of one vectored thruster may be increased in comparison to the pitch of the propeller of the other vectored thruster. The differential pitch will generate differential lift, applying a rolling moment to the helicopter. As a second example, when the vectored thrusters are oriented parallel to the longitudinal axis of the aircraft, the differential pitch of the thruster propellers will generate a differential forward thrust, applying a yawing moment to the aircraft. The rolling or yawing moment applied by the vectored thrusters may be selected by the control system based upon pre-selected control rules for any flight condition or by pilot command.

Each of the two vectored thrusters is equipped with vanes mounted in the stream of air exiting the vectored thruster. The vanes selectably (and differentially) redirect the exhaust of the two vectored thrusters, providing control flexibility to the control system and the pilot. For example, when the axis of rotation of the thruster propellers is oriented in the generally vertical direction, the pilot or control system may direct the vanes to channel the exhaust of the vectored thrusters toward the front or to the rear of the aircraft. If the vanes of both vectored thrusters are directed forward, the reaction forces generated by the exhaust air acting on the vanes urge the helicopter in the aft direction. If the vanes of both vectored thrusters are directed aft, the reaction forces urge the helicopter forward. If the vanes of one of the vectored thrusters are directed forward and the vanes of the other thruster are directed aft, the vectored thrusters apply a yawing moment to the helicopter. If the vanes of both vectored thrusters are in the central position, the vectored thrusters provide only lift. The use of vanes provides options for the control of directional movement and yaw when the helicopter is in hover or moving at a low speed.

When the vectored thrusters are tilted so that the axes of rotation of the thruster propellers are parallel to the longitudinal axis of the helicopter, the vanes allow the exhaust of the vectored thrusters to be directed differentially up, down, or to the rear of the aircraft. When the vanes of both vectored thrusters are directed down, the reaction of the exhaust on the vanes generates additional lift. When the vanes of both vectored thrusters are in a central position, the exhaust of the vectored thrusters is directed aft, urging the helicopter forward. When the vanes are directed differentially, the thrusters apply a rolling moment to the helicopter.

The combination of differentially variable thruster propeller pitch and differentially variable vane angle provide control alternatives and additional control power for pitch and roll for every orientation of the vectored thrusters.

The control system may be configured so that the operation of the vectored thrusters and associated controls is automatic and does not require separate attention from the pilot. If the control system is so configured, the pilot operates the helicopter using conventional flight controls. The control system receives the conventional throttle, collective, cyclic and yaw control inputs from the pilot and applies pre-determined control rules to coordinate the simultaneous operation of the vectored thruster tilt, differential propeller pitch and differential vane angle. The control system will apply the control rules to vary smoothly and continuously the vectored thruster tilt, vane angle and propeller pitch throughout the range of vectored thruster tilt positions to achieve the desired lift, thrust, yawing moment and rolling moment appropriate to the flight condition and pilot command.

Because the vectored thruster tilt, differential propeller pitch and differential vane angle provide alternative means to control the aircraft, the control system may be programmed to allocate control between the conventional helicopter controls and the vectored thrusters. As an example of control allocation, when a tandem-rotor helicopter is in hover and the vectored thrusters are oriented in a generally vertical direction, the control system may allocate a pilot command for yaw to differential cyclic pitch of the tandem rotors as a first option. As a second option, the control system may allocate the pilot command for yaw to differential vane angles for the two vectored thrusters. As a third option, the control system also may implement a pilot command for yaw by implementing both differential cyclic pitch for the tandem rotors and differential vane angles for the vectored thrusters where additional control power is required.

The allocation by the control system among control options will vary according to the control rules programmed into the control system. The pre-determined control rules are selected to achieve optimal operation of the aircraft. The control rules may vary by flight condition and may vary according to criteria pre-selected by the pilot or by an authorized person, such as the owner of the helicopter. Specifically, the pilot may select an acceleration envelope for the aircraft. The control system then will apply control rules dictated by the selected acceleration envelope and will allocate force in the forward direction during forward acceleration between the rotor controls, vectored thruster tilt, thruster propeller pitch and vane angle.

Consider the example of a tandem-rotor helicopter in an initial condition of a hover with the vectored thrusters in a generally vertical orientation and the vanes in the central position. Upon a command from the pilot for forward acceleration, the control system commands the vanes of both vectored thrusters to direct the exhaust of the vectored thrusters aft, causing the aircraft to accelerate forward. The control system also selects a thruster propeller pitch consistent with the control rules relating to the allocating of forward thrust to the vectored thrusters. The degree by which the vanes direct the vectored thruster exhaust aft is determined by the control rules, the selected acceleration envelope, and by the available engine power.

Simultaneously, the control system increases the collective pitch of the aft rotor and decreases the collective pitch of the forward rotor, pitching the helicopter into a nose-low attitude. In the nose-low attitude, the thrust generated by the fore and aft rotors accelerates the aircraft forward. The pilot or the control system selects a combination of throttle position and collective pitch for both rotors to achieve the desired nose-low attitude while maintaining the desired altitude.

The control system monitors inflow airspeed and inflow direction at the inlets to the vectored thrusters, in addition to other parameters. As the helicopter accelerates, its air speed increases. As the airspeed increases, the control system tilts the vectored thrusters forward, maintaining sufficient airflow through the vectored thrusters for efficient operation. The control system applies control rules to balance vectored thruster tilt, thruster propeller pitch and vane position to maintain a selected forward thrust and a selected lift from the vectored thrusters. The control system also may trim differentially the thruster propeller pitch and vane angle to maintain any desired pitch and roll moment control allocated to the vectored thrusters.

The control system may be configured to allow the pilot to select manually a tilt angle for the vectored thrusters. The control rules may be authorized to change automatically the tilt angle of the vectored thrusters by a predetermined amount to accommodated changes in flight condition.

III. BRIEF DESCRIPTION OF THE DRAWINGS

IV. DESCRIPTION OF AN EMBODIMENT

Figure 1:
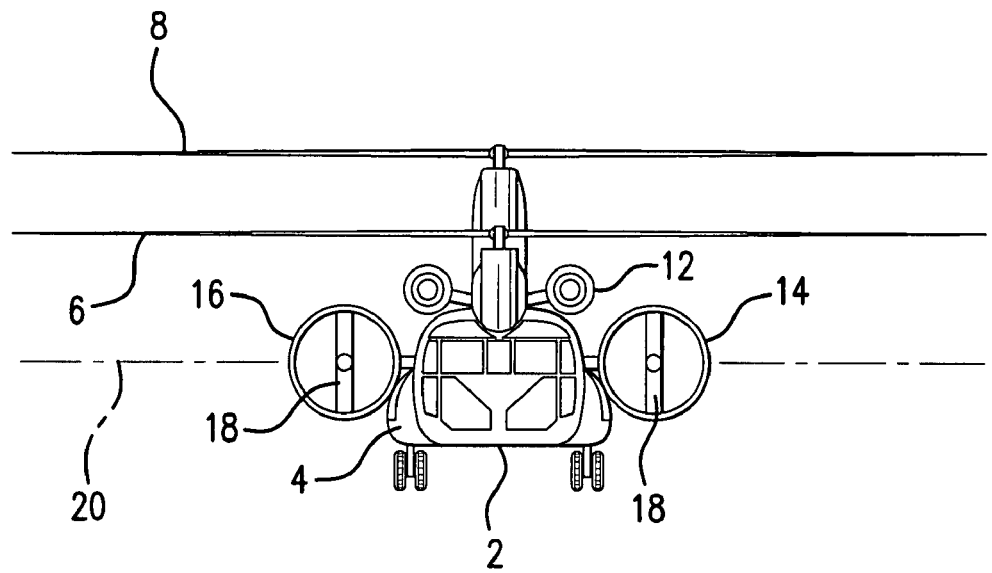
FIG. 1 is a front view of a tandem-rotor helicopter equipped with the vectored thrusters of the Invention with the vectored thrusters in a first position.
Figure 2:
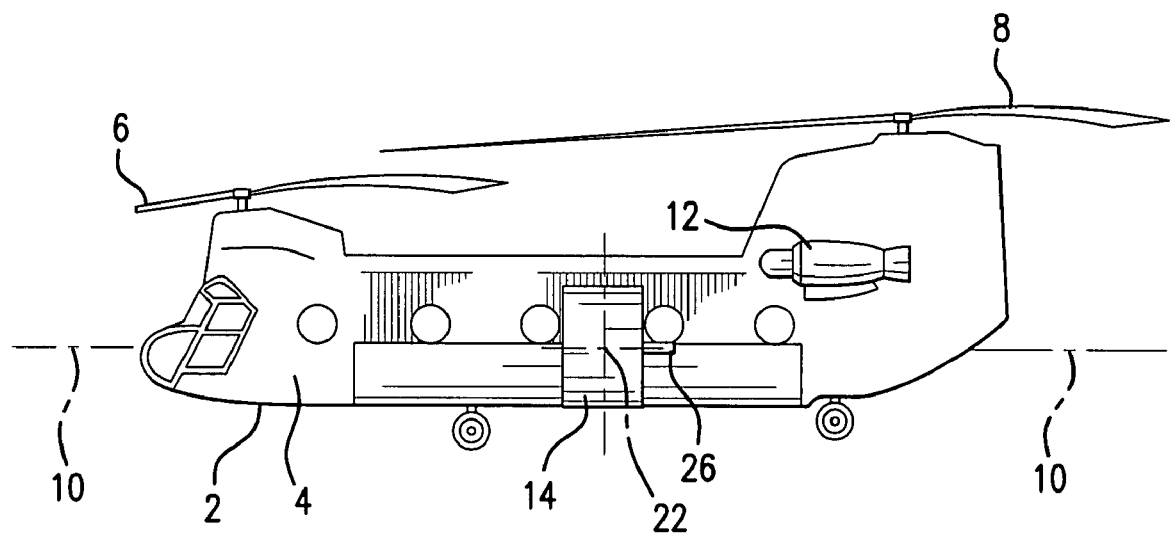
FIG. 2 is a side view of a tandem-rotor helicopter equipped with the vectored thrusters in the first position.

A tandem-rotor helicopter equipped with the Invention is illustrated by FIGS. 1 through 8 and 13 through 16. As illustrated by FIGS. 1 and 2, a tandem-rotor helicopter 2, such as a Boeing CH-47 Chinook, has a fuselage 4, a fore main rotor 6 and an aft main rotor 8. The helicopter 2 has a longitudinal axis 10 corresponding to a direction of forward travel of the helicopter 2. One or more engines 12 provide power to operate the fore and aft main rotors 6, 8 and the other systems of the helicopter 2.

The helicopter 2 is equipped with a port vectored thruster 14 and a starboard vectored thruster 16 located on opposing sides of fuselage 4. The vectored thrusters 14, 16 are ducted fans each having a controllable-pitch propeller 18. Vectored thrusters 14, 16 may be selectably tilted about a transverse axis 20 between a first position, illustrated by FIGS. 1-3, and a second position, illustrated by FIGS. 4-6. First and second positions of vectored thrusters 14, 16 differ by a tilt of approximately 90 degrees. Transverse axis 20 is generally horizontal when the helicopter 2 is in coordinated, level flight and is generally normal to the longitudinal axis 10 of helicopter 2. Transverse axis 20 generally runs through the center of gravity 22 of the helicopter 2, although any location for the transverse axis 20 is contemplated by the Invention.

Figure 3:
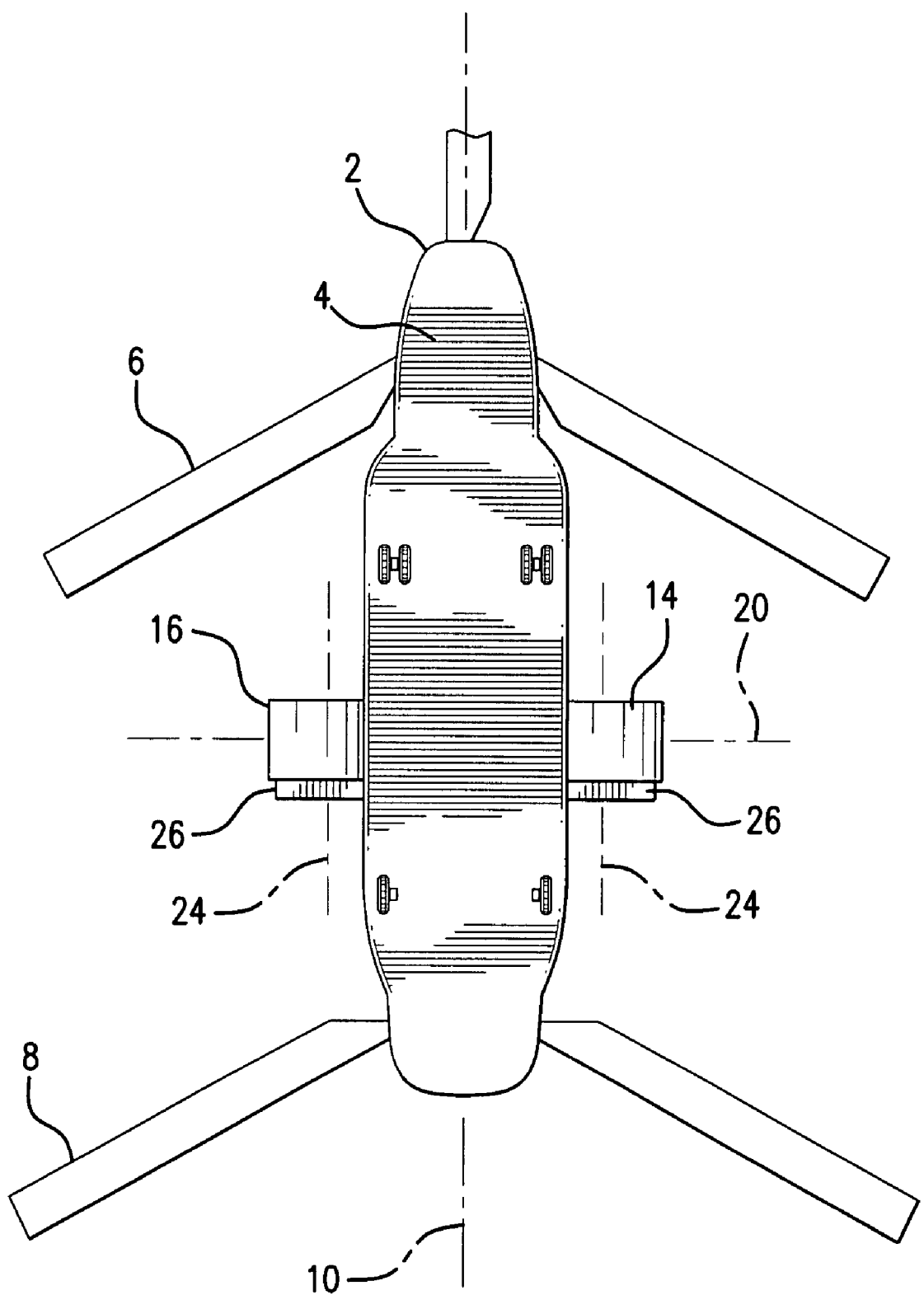
FIG. 3 is a bottom view of the tandem-rotor helicopter with the vectored thrusters in the first position.
Figure 4:
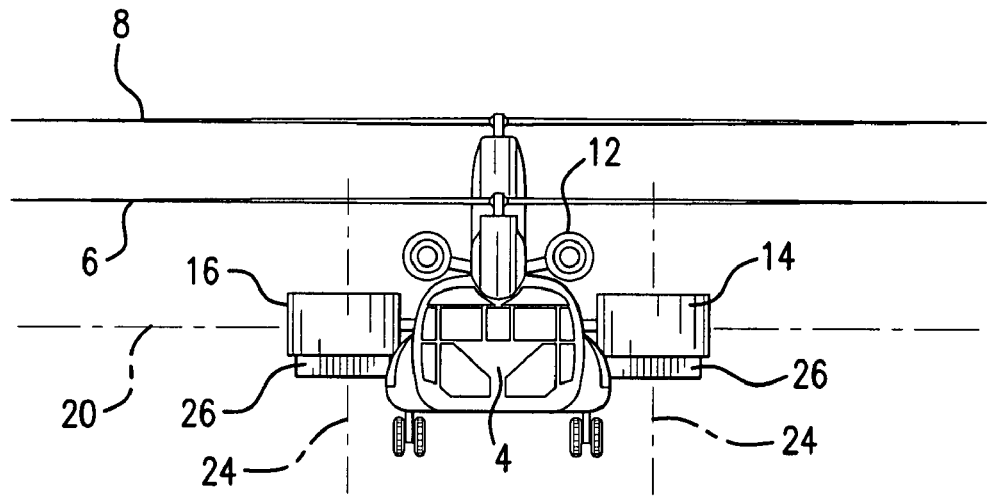
FIG. 4 is a front view of a tandem-rotor helicopter equipped with the vectored thrusters in a second position.
Figure 5:
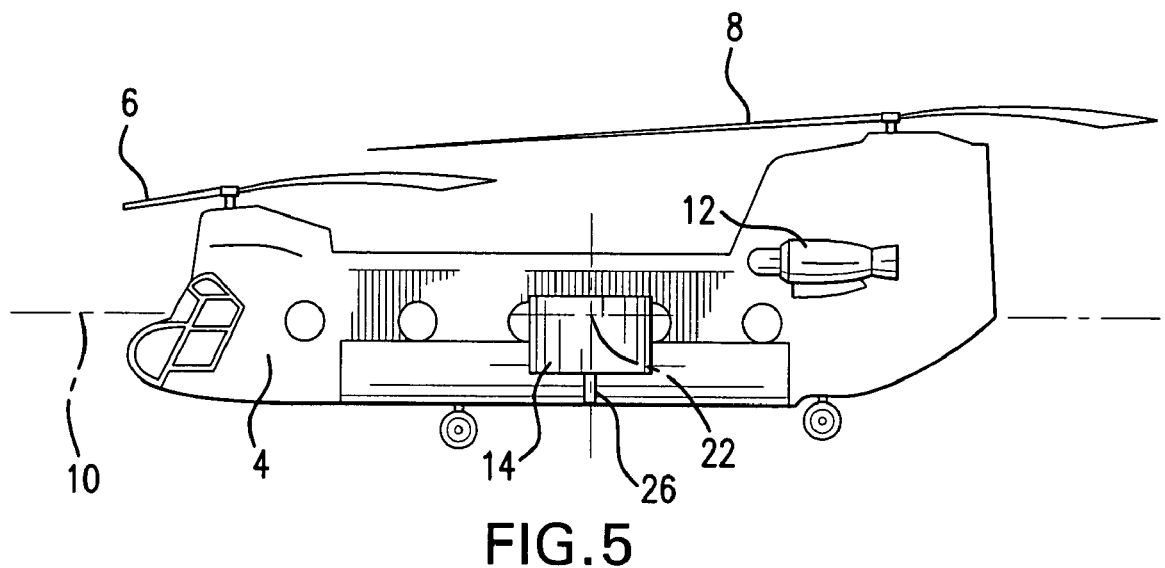
FIG. 5 is a side view of a tandem-rotor helicopter equipped with the vectored thrusters in the second position.
Figure 6:
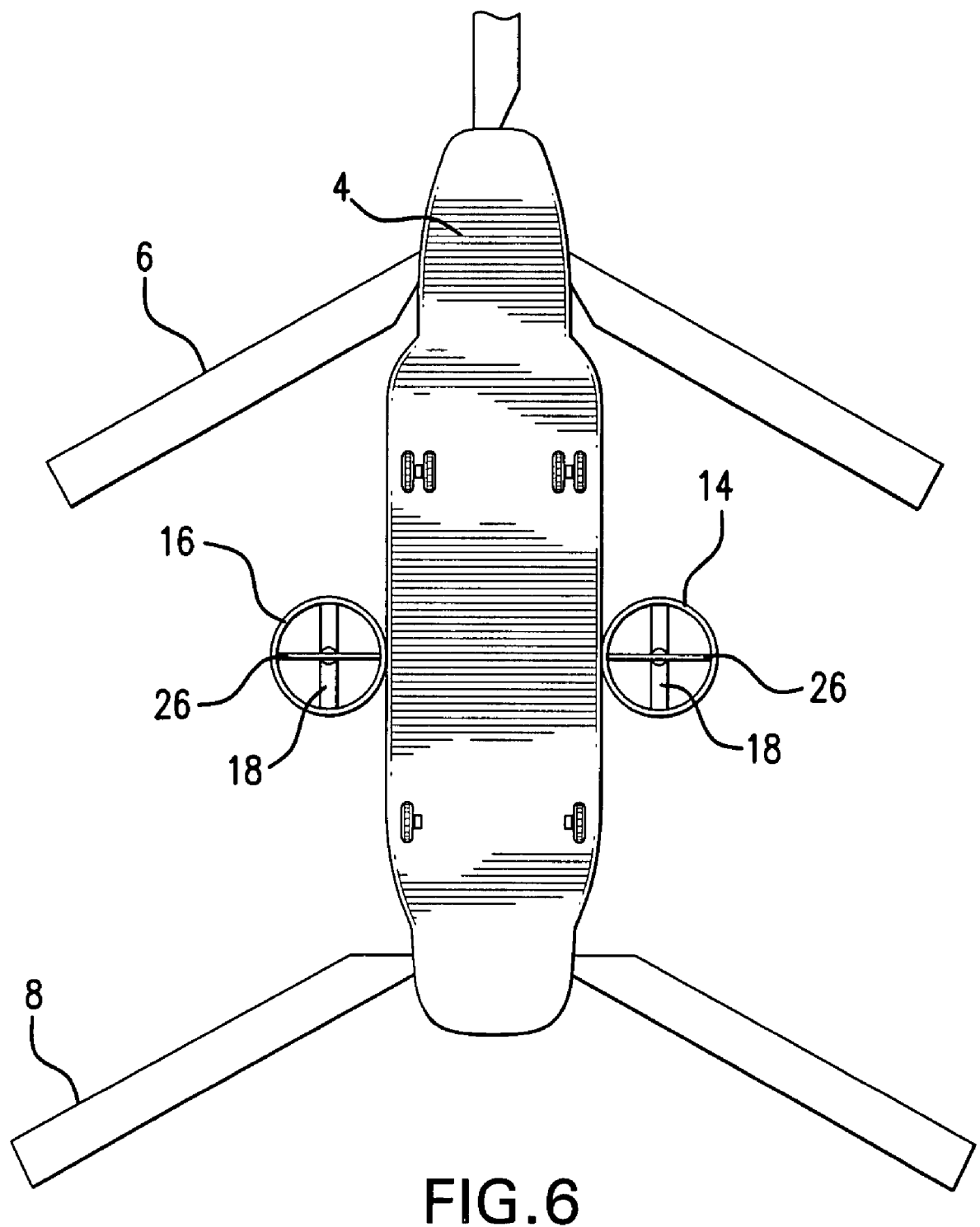
FIG. 6 is a bottom view of the tandem-rotor helicopter equipped with the vectored thrusters in second position.

When the vectored thrusters 14, 16 are located in the first position illustrated by FIGS. 1-3, air exhausting from the vectored thrusters 14, 16 is directed toward the rear of the helicopter 2, urging the helicopter 2 forward. When the vectored thrusters 14, 16 are in the second position illustrated by FIGS. 3-6, air exhausting from the vectored thrusters is directed generally downward when the aircraft is level, providing lift to the helicopter 2.

Figure 7:
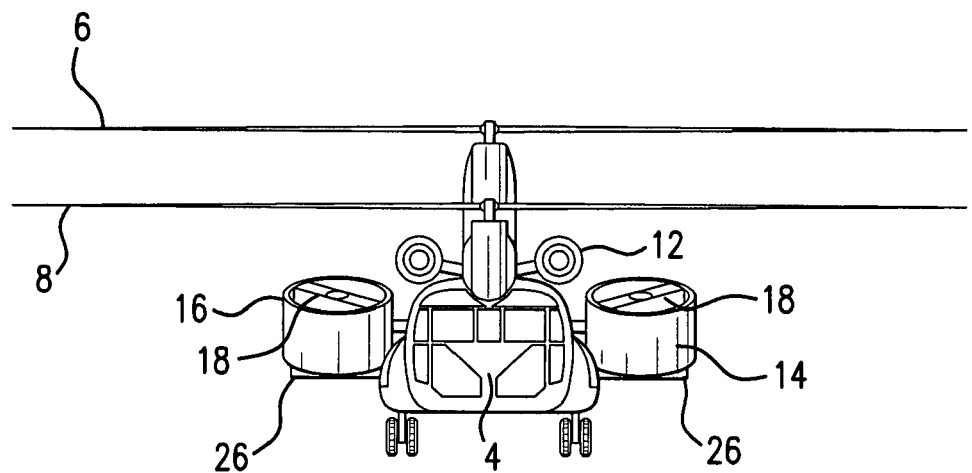
FIG. 7 is a front view of a tandem-rotor helicopter equipped with the vectored thrusters in an intermediate position.
Figure 8:
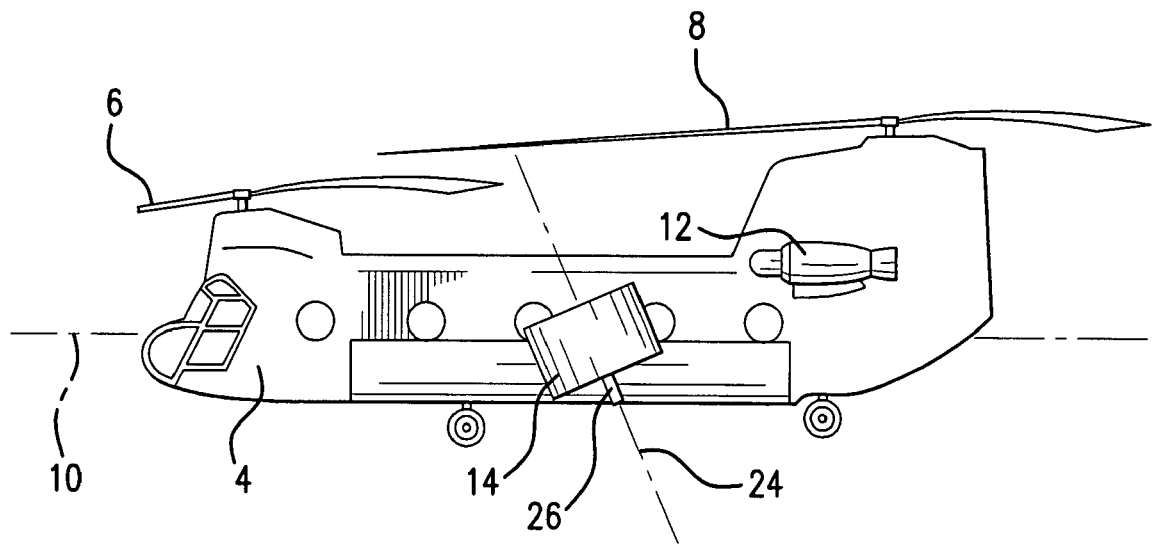
FIG. 8 is a side view of a tandem rotor helicopter equipped with the vectored thrusters in an intermediate position.

FIGS. 7 and 8 illustrate tilt of the vectored thrusters 14, 16 in a position intermediate to the first and second positions illustrated by FIGS. 1-3 and 4-6, respectively. A vectored thruster 14, 16 position intermediate between the first and second positions may be selected, for example during forward acceleration of the helicopter 2 to achieve a commanded acceleration consistent with a selected acceleration envelope. As a second example, an intermediate position of the vectored thrusters 14, 16 may be selected during coordinated flight to maintain sufficient airflow through the vectored thrusters 14, 16 for efficient operation of the vectored thrusters.

Propellers 18 of port and starboard vectored thrusters 14, 16 have propeller axes of rotation 24. When the vectored thrusters 14, 16 are in the first position as shown by FIGS. 1-3, propeller axes of rotation 24 are generally parallel to helicopter longitudinal axis 10. When vectored thrusters 14, 16 are moved from the first position to the second position shown by FIGS. 4-6, propeller axes of rotation 24 rotate with the vectored thrusters 14, 16 approximately 90 degrees and are oriented generally in a vertical direction when the helicopter 2 is in level flight.

Propellers 18 of the port and starboard vectored thrusters 14, 16 have differentially controllable propeller pitch. The differentially controllable propeller pitch allows different amounts of propeller pitch to be selected for each propeller 18 and therefore allows the propellers 18 of the port and starboard vectored thrusters 14, 16 to generate different amounts of thrust even though the propeller are turning at the same rotational speed. The control effects of this differentially controllable propeller pitch are discussed below.

Figure 9:
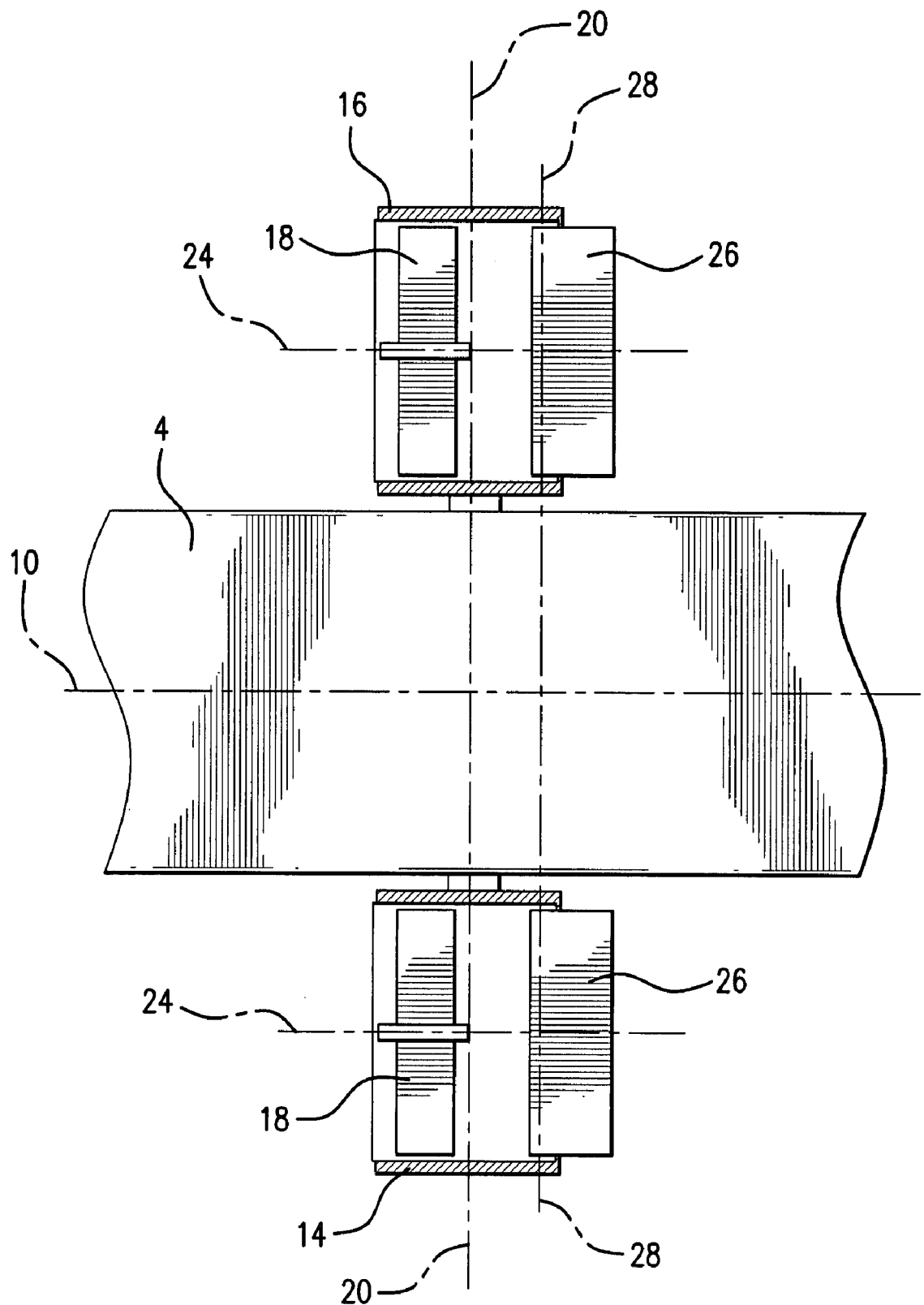
FIG. 9 is a top view of a partial cutaway schematic of the two vectored thrusters in the first position.

As shown by FIG. 9, which is a partial cutaway top view of helicopter 2 with the vectored thrusters 14, 16 in the first position, each vectored thruster 14, 16 is equipped with a controllable horizontal vane 26. The horizontal vanes 26 are located in the exhaust of the vectored thrusters 14, 16 so that the air exhausting from the vectored thrusters 14, 16 passes over the vanes 26. The horizontal vanes 26 may be rotated with respect to each vectored thruster 14, 16 to direct the flow of air exhausting from the vectored thrusters 14, 16. Each horizontal vane 26 has a horizontal vane axis of rotation 28. Each horizontal vane axis or rotation 28 is generally parallel to the transverse axis 20.

Figure 10:
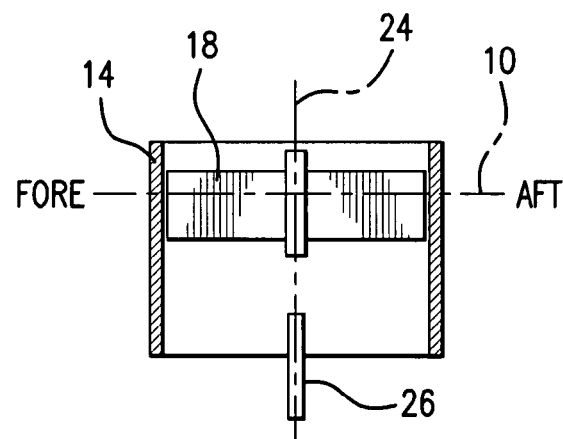
FIG. 10 is a cutaway side view of a vectored thruster in the second position.
Figure 11:
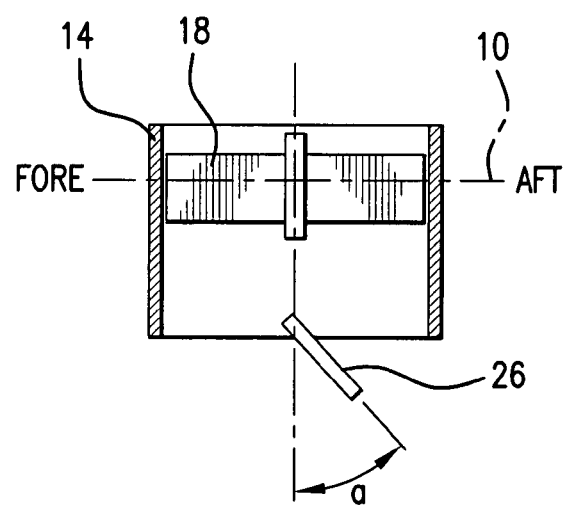
FIG. 11 is a cutaway side view of the vectored thruster in the second position.
Figure 12:
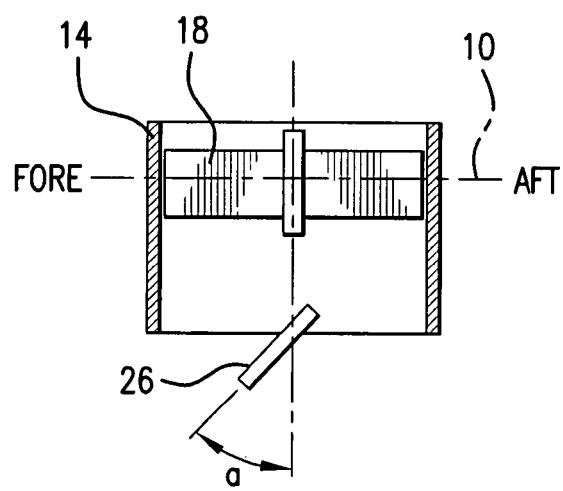
FIG. 12 is a cutaway side view of the vectored thruster in the second position.

Operation of the horizontal vanes is illustrated by FIGS. 10-12. While FIGS. 10-12 illustrate only the port vectored thruster 14, the starboard vectored thruster 16 generally is a mirror image of the port vectored thruster 14 and the operation of the horizontal vanes 26 of the starboard and port vectored thrusters 14, 16 are similar.

FIGS. 10-12 are detail cross sections of the port vectored thruster 14 in the second position with the propeller axis of rotation 24 oriented in a vertical direction, as when the helicopter 2 is in a hover mode. The helicopter longitudinal axis 10 and the forward and aft directions are indicated on FIGS. 10-12. FIG. 10 shows the horizontal vane 26 in a central position. In the central position illustrated by FIG. 10, the port vectored thruster 14 exerts only lift to the helicopter 2. FIG. 11 shows the horizontal vane 26 deflected in the aft direction by a vane angle 'a' with respect to the propeller 18 axis of rotation 24. When the horizontal vane 26 is deflected in the aft direction, the reaction of air exhausting from the port vectored thruster 14 against the horizontal vane 26 urges the port vectored thruster 14 in the forward direction. FIG. 12 shows the horizontal vane 26 deflected in the forward direction by vane angle 'a' with respect to the propeller axis of rotation 24. When the horizontal vane is deflected in the forward direction, the reaction of the air exhausting from the port vectored thruster 14 against the horizontal vane 26 urges the port vectored thruster 14 in the aft direction.

Propellers 18 have differentially controllable pitch, so that the pitch of propeller 18 of the starboard vectored thruster 16 may be controlled separately from the pitch of propeller 18 of the port vectored thruster 14. The horizontal vanes 26 of both vectored thrusters 14, 16 also are differentially controllable so that the horizontal vane 26 of the starboard vectored thruster 16 may be controlled separately from the horizontal vane 26 of the port vectored thruster 14.

Figure 13:
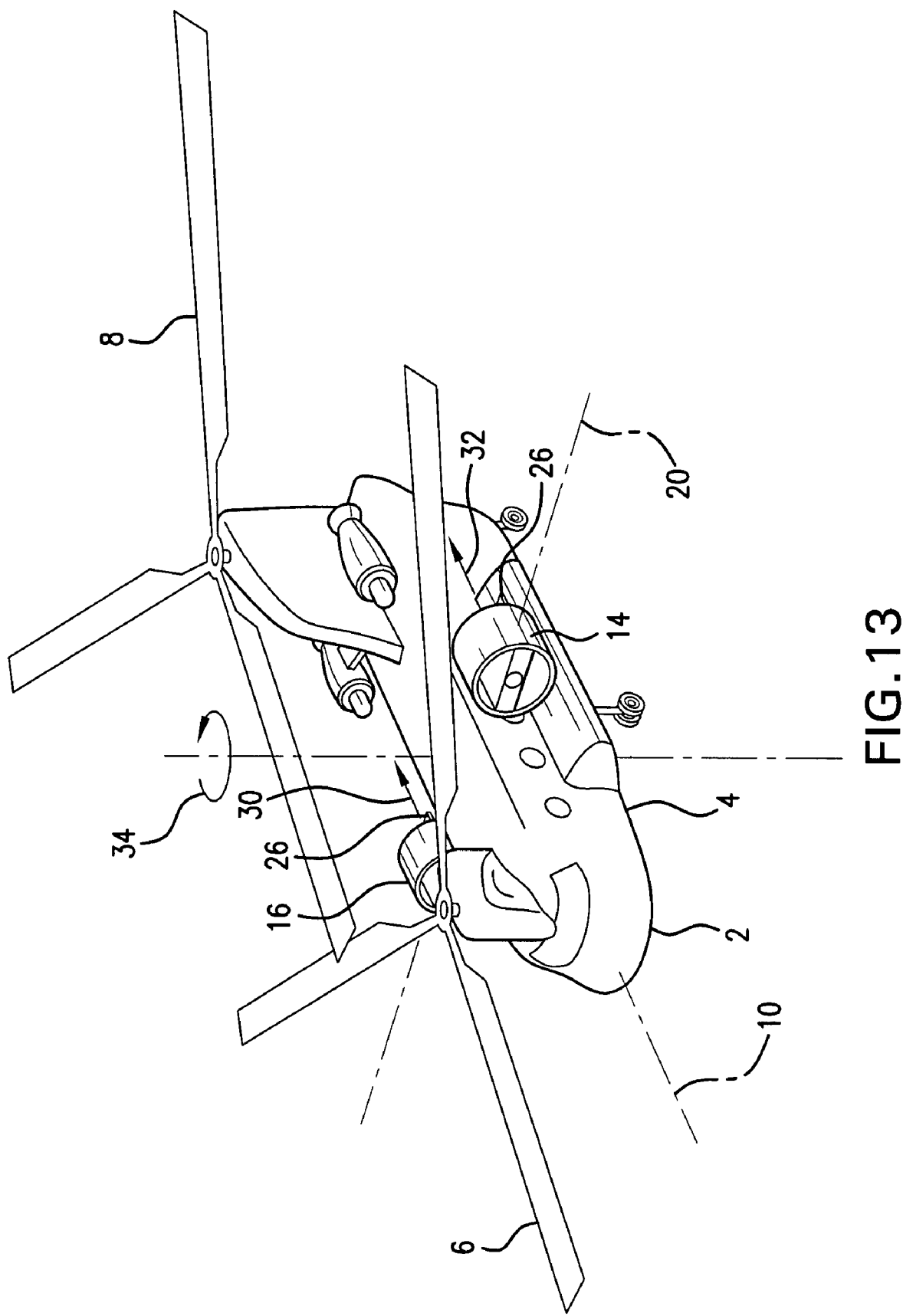
FIG. 13 is a perspective view of a tandem rotor helicopter equipped with the Invention illustrating yawing moment when the vectored thrusters are in the first position.
Figure 14:
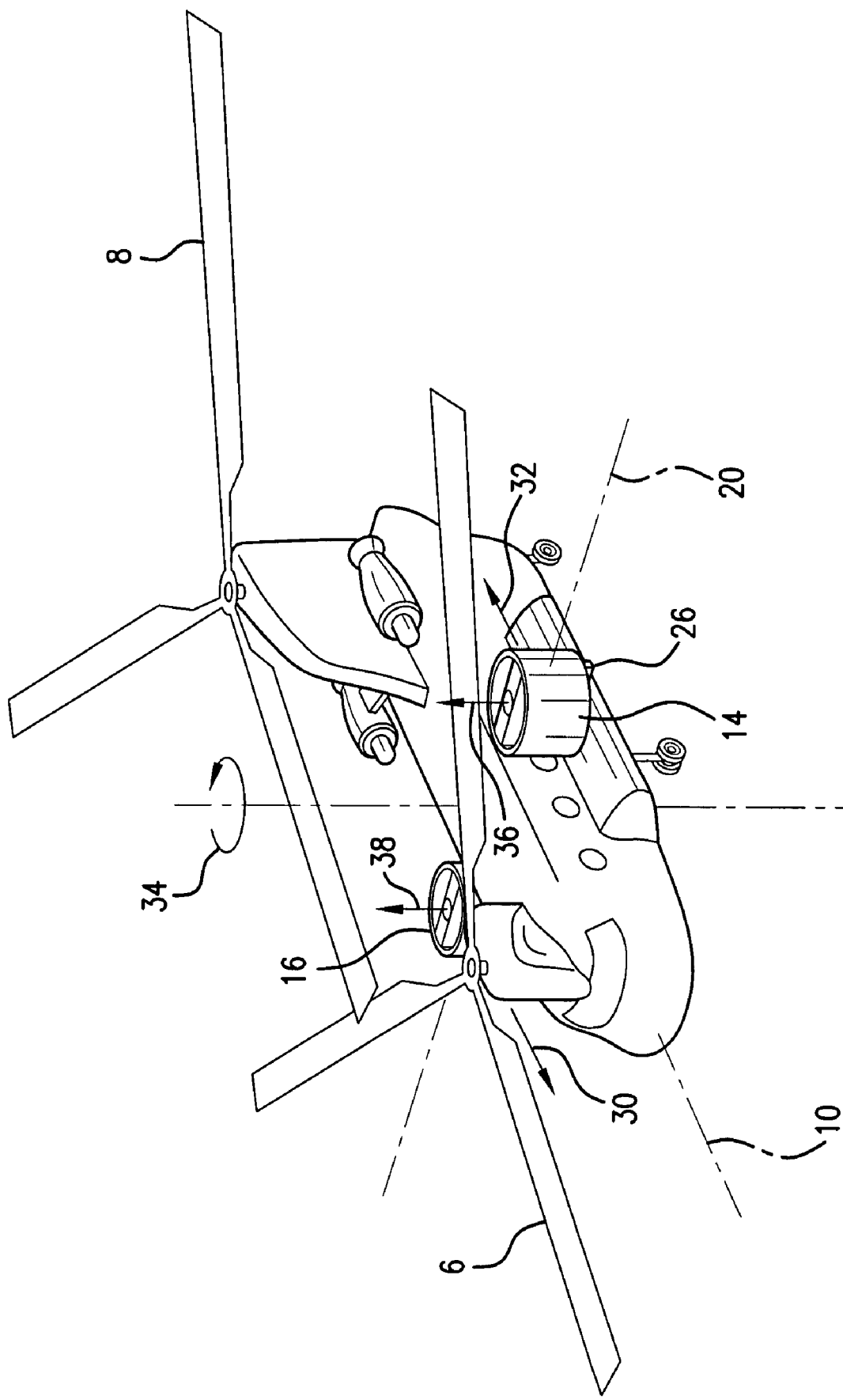
FIG. 14 is a perspective view of a tandem-rotor helicopter equipped with the Invention illustrating yawing moment when the vectored thrusters are in the second position.

The differential control of the horizontal vanes 26 and the propeller 18 pitches of the two vectored thrusters 14, 16 allow substantial control flexibility and additional control power for roll and yaw, as illustrated by FIGS. 13-16. FIGS. 13 and 14 illustrate the control for yaw. FIG. 13 shows a helicopter 2 with the vectored thrusters 14, 16 in the first position. By increasing the propeller 18 pitch of the starboard vectored thruster 16 and decreasing the propeller 18 pitch of the port vectored thruster 14, the starboard thrust 30 from the starboard vectored thruster 16 is greater than the port thrust 32 from the port vectored thruster 14. Since the two vectored thrusters 14, 16 are in a spaced-apart relation along the transverse axis 20, the difference in thrust 32, 30 applies a yawing moment 36 to the helicopter 2.

FIG. 14 illustrates the control operation for yaw when the vectored thrusters 14, 16 are in the second position. With the horizontal vanes 26 in the neutral position illustrated by FIG. 10, the port vectored thruster 14 generates port lift 36 and the starboard vectored thruster generates starboard lift 38. Deflection of the horizontal vane 26 of the starboard vectored thruster 16 toward the rear of the aircraft (illustrated by FIG. 11) generates starboard thrust 30 in the forward direction by reaction of the exhaust air from the starboard vectored thruster 16 moving past the deflected vane 26. Similarly, deflecting the horizontal vane 26 of the port vectored thruster 14 toward the front of the aircraft (illustrated by FIG. 12) generates a port thrust 32 toward the rear of the helicopter 2. The port thrust 32 and the starboard thrust 30 in different directions generates a yawing moment 34 on the helicopter 2.

Figure 15:
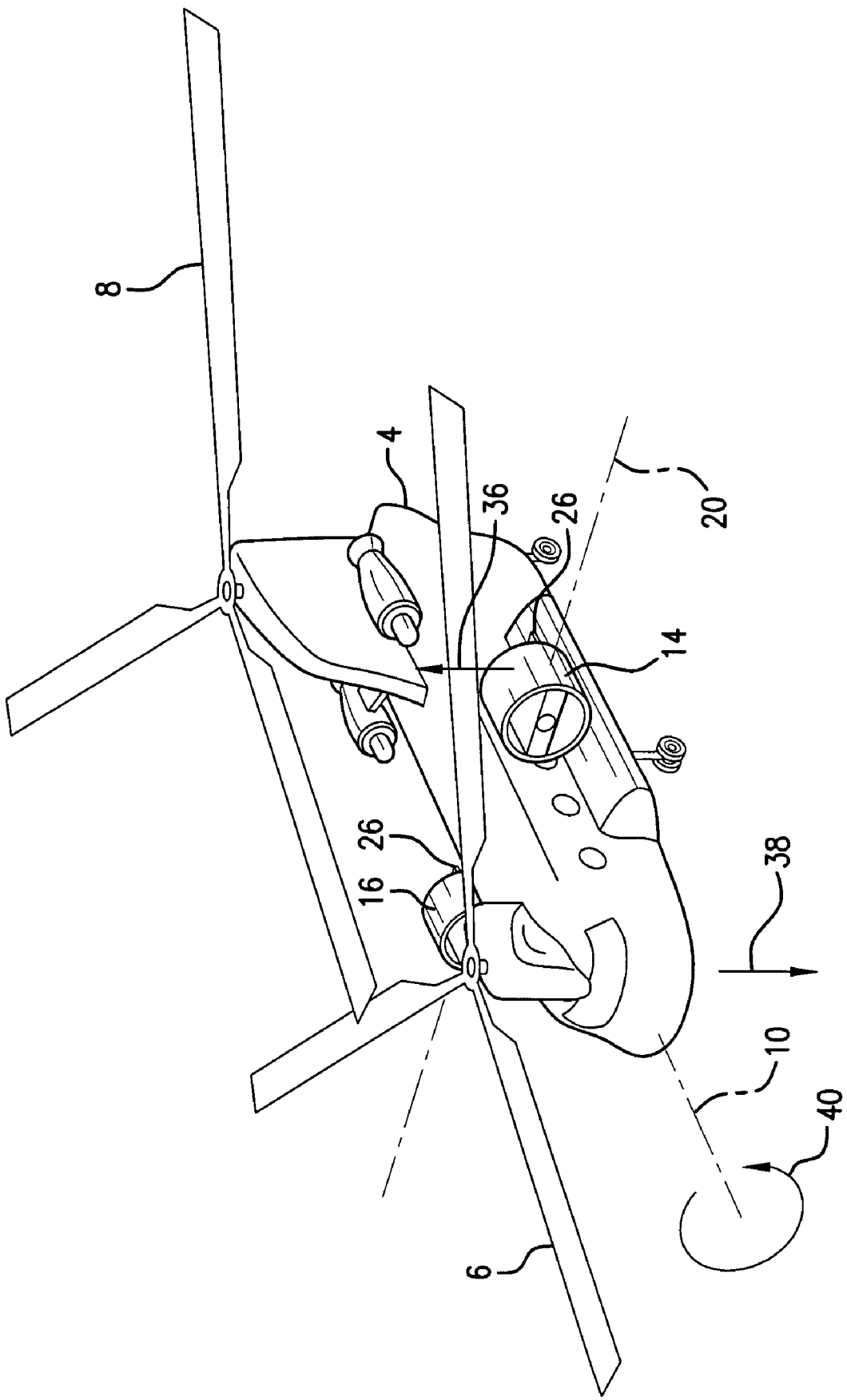
FIG. 15 is a perspective view of a tandem-rotor helicopter equipped with the Invention illustrating rolling moment when the vectored thrusters are in the first position.
Figure 16:
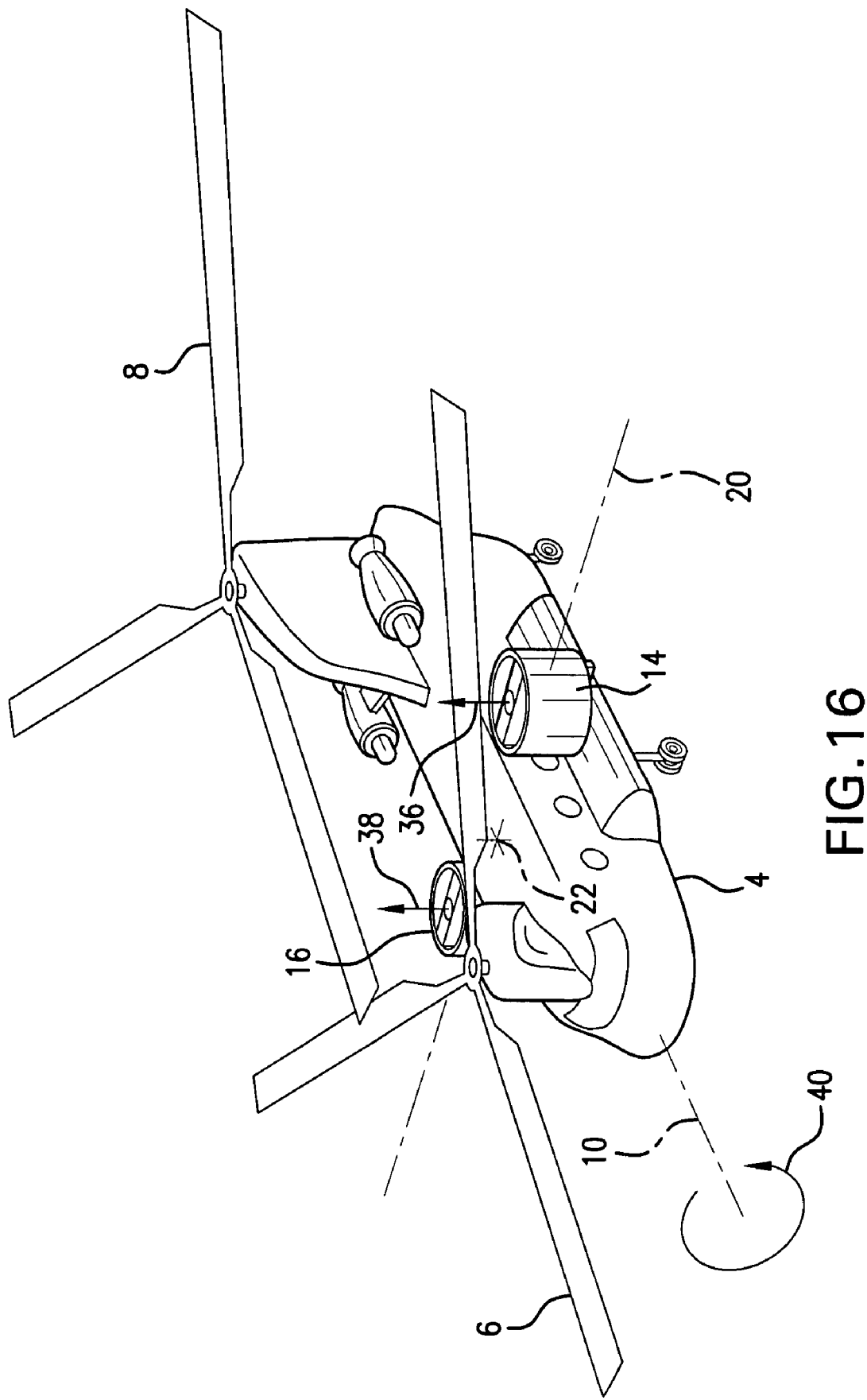
FIG. 16 is a perspective view of a tandem-rotor helicopter equipped with the Invention illustrating rolling moment when the vectored thrusters are in the second position.

FIGS. 15 and 16 illustrate the control operation for roll when the vectored thrusters 14, 16 are in the first position. When the horizontal vane 26 of the port vectored thruster 14 is deflected downward, the reaction of the exhaust air from the port vectored thruster 14 passing over the horizontal vane 26 generates port lift 36 in an upward direction, as shown by FIG. 15. When the horizontal vane 26 of the starboard vectored thruster 16 is deflected upward, the reaction of the exhaust air from the starboard vectored thruster 16 passing over the horizontal vane 26 generates a negative starboard lift 38, driving the starboard vectored thruster 16 downward. The combination of the spaced-apart upward port lift 36 and the negative starboard lift 38 imparts a rolling moment 40 to the helicopter 2.

In FIG. 16, the vectored thrusters 14, 16 are in the second position and are generating port lift 36 and starboard lift 38. Increasing the pitch of the propeller 18 of the port vectored thruster 14 and decreasing the pitch of the propeller 18 of the starboard vectored thruster 16 increases port lift 36 and decreases starboard lift 38. The difference in port and starboard lift imparts a rolling moment 40 on the helicopter about the longitudinal axis 10.

From FIGS. 13-16, additional yawing moment 34 and rolling moment 40 can be applied to the helicopter 2 by differentially controlling propeller 18 pitch and horizontal vane 26 angle for every position of the vectored thrusters 14, 16. The additional control power extends the control envelope of the helicopter 2 of the Invention and allows the helicopter 2 of the Invention to execute maneuvers in a manner and with a power that would not be possible with a conventional helicopter 2 that is not equipped according to the Invention.

The yawing moment 34 and rolling moment 40 available from the selection of propeller 18 pitch and horizontal vane 26 angle of the vectored thrusters 14, 16 also provide control flexibility so that control for roll and yaw may be allocated among the conventional helicopter 2 controls and the controls of the vectored thrusters 14, 16 to meet pre-determined goals. For example, for a given flight condition the control system 42 may allocate 70% of a desired rolling moment 40 to the rotor 6, 8 cyclic controls and 30% to the vectored thruster 14, 16 controls of propeller 18 pitch and horizontal vane 26 angle to achieve a pre-determined flight goal, such as to minimize lifecycle costs or to minimize vibration.

Figure 17:
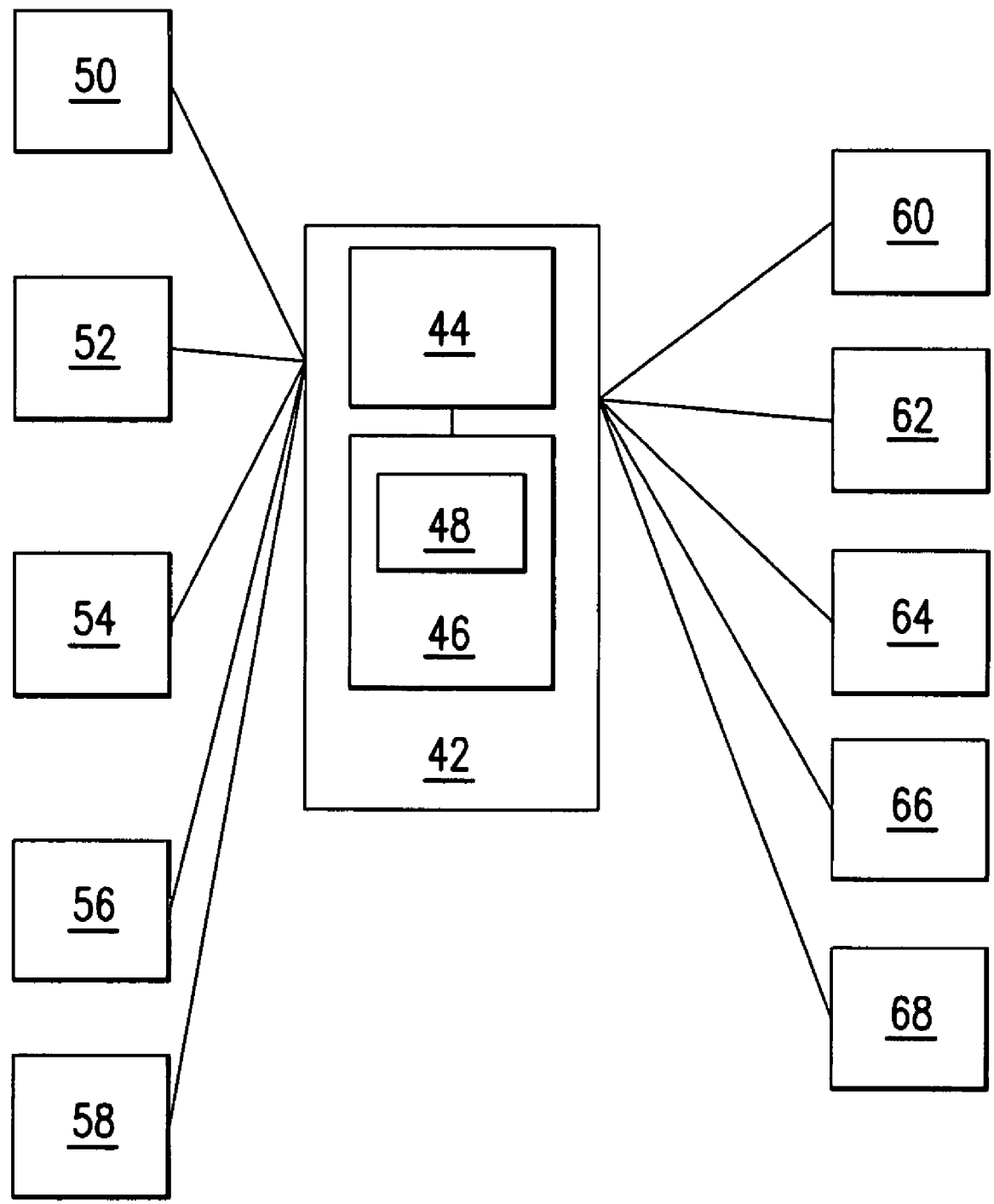
FIG. 17 is a schematic diagram of the control system of the Invention.

While the apparatus of the Invention may be manually controlled, an automatic control system 42 may substantially automate the elements of the tilt angle of vectored thrusters 14, 16, pitch of propellers 18, and angle of horizontal vanes 26 for a given flight condition of the helicopter 2 and command from a pilot. FIG. 17 is a schematic diagram illustrating the control system of the Invention. The control system 42 includes a microprocessor 44. The microprocessor is operably connected to a computer memory 46. Resident in the computer memory 46 is a database 48 of combinations of control settings for the tilt of the vectored thrusters 14, 16, the angle of horizontal vanes 26 and the pitch of propellers 18 for every flight condition of the helicopter 2. The control system 42 receives flight condition data from a variety of sensors, including a sensor 50 for torque available from the engine, a sensor 52 for angle of attack, sensors 54 for cyclic and collective flight control positions, a sensor 56 for total aircraft airspeed, and sensors 58 for thruster inlet airspeed and direction.

The control system 42 will consider the sensor 50-58 inputs and will select from database 48 a combination of control positions for the vectored thruster 14, 16 tilt angle, differential propeller 18 pitch and differential horizontal vane 26 angle appropriate to the detected combination of sensor 50-58 inputs. The selected combination of control positions from database 48 will contain commands for tilt of the vectored thrusters 14, 16, angle of the port vectored thruster horizontal vane 26, angle of the starboard vectored thruster 16 horizontal vane 16, pitch of the propeller 18 of the port vectored thruster 14 and pitch of the propeller 18 of the starboard vectored thruster 16. The control system 42 will send instructions to actuators 60-68 to implement the control positions selected by the control system 42. Actuators 60-64 will include a thruster tilt actuator 60, a port propeller pitch actuator 62, a starboard propeller pitch actuator 64, a port vane actuator 66 and a starboard vane actuator 68.

The control system 42 will be programmed to smoothly transition from one combination of control settings to the next and to select the combination of actuator 60-68 settings most appropriate to achieve an optimal lift 36, 38 and thrust 30, 32 of the vectored thrusters 14, 16 consistent with the flight conditions detected by sensors 50-58.

In building database 48 and programming microprocessor 44, control rules will be applied consistent with optimal operation of the helicopter 2. The control system 42 may allow a pilot to select from among more than one possible combination of actuator 60-68 settings for a particular flight condition; for example, for the transition period of acceleration from hover. The pilot may select a desired acceleration characteristic, referred to as an 'acceleration corridor,' from among a plurality of such acceleration corridors. The control system 42 will select a combination of actuator settings 60-68 appropriate to the flight condition detected by sensors 50-58 and corresponding to the selected acceleration corridor.

The control system may be programmed to allow a manual selection of vectored thruster 14, 16 tilt by the pilot with the control system 42 authorized to override the pilot within pre-determined limits. The control settings in the database 48 also are selected when the database is constructed to prevent the pilot from causing a stall of the rotors 6, 8 or propellers 18 or causing a power-deficient condition, particularly during transition conditions of maneuvering flight.

Figure 18:
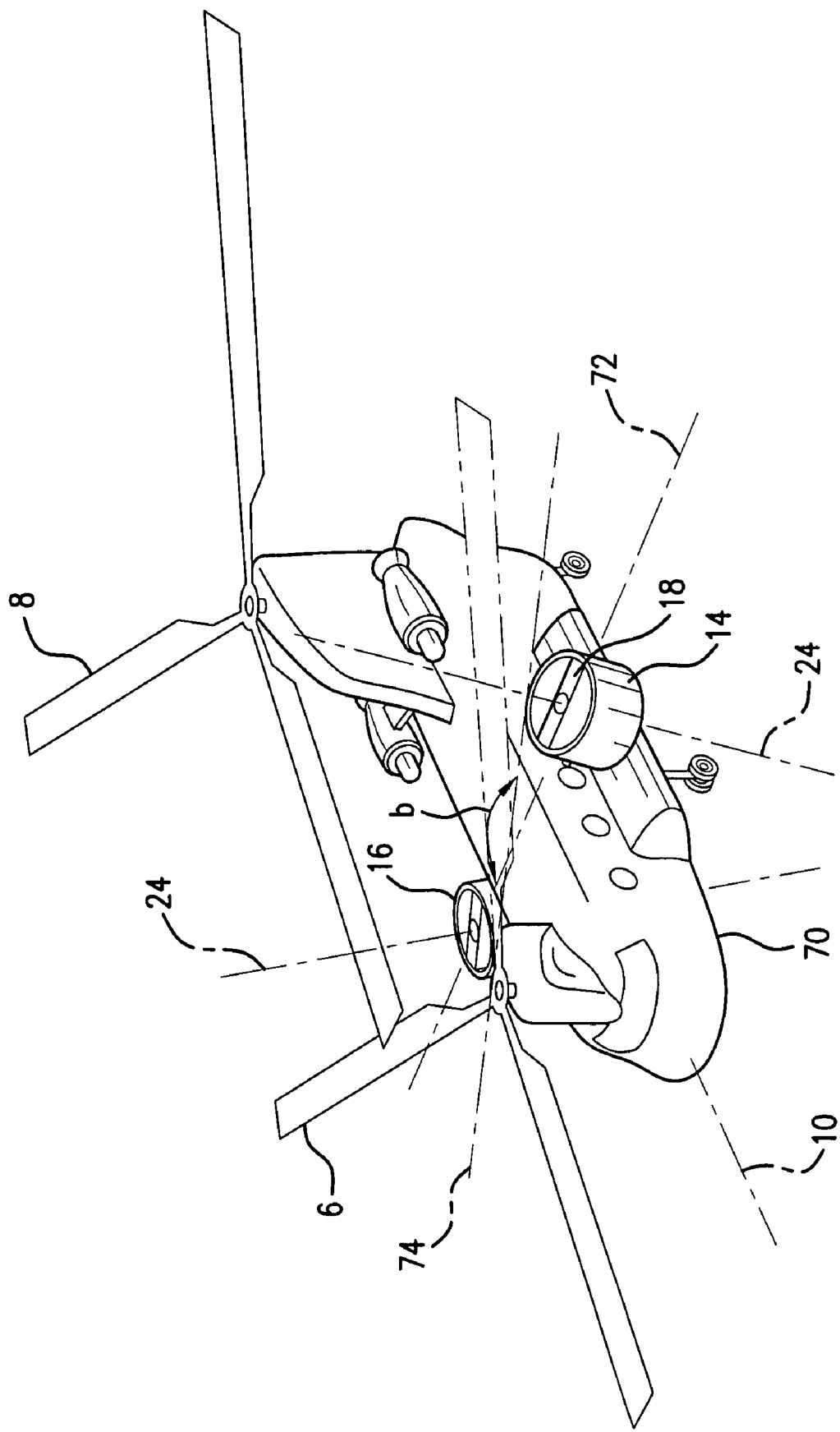
FIG. 18 is a perspective view of a Boeing CH-47 Chinook helicopter equipped with the Invention.
Figure 19:
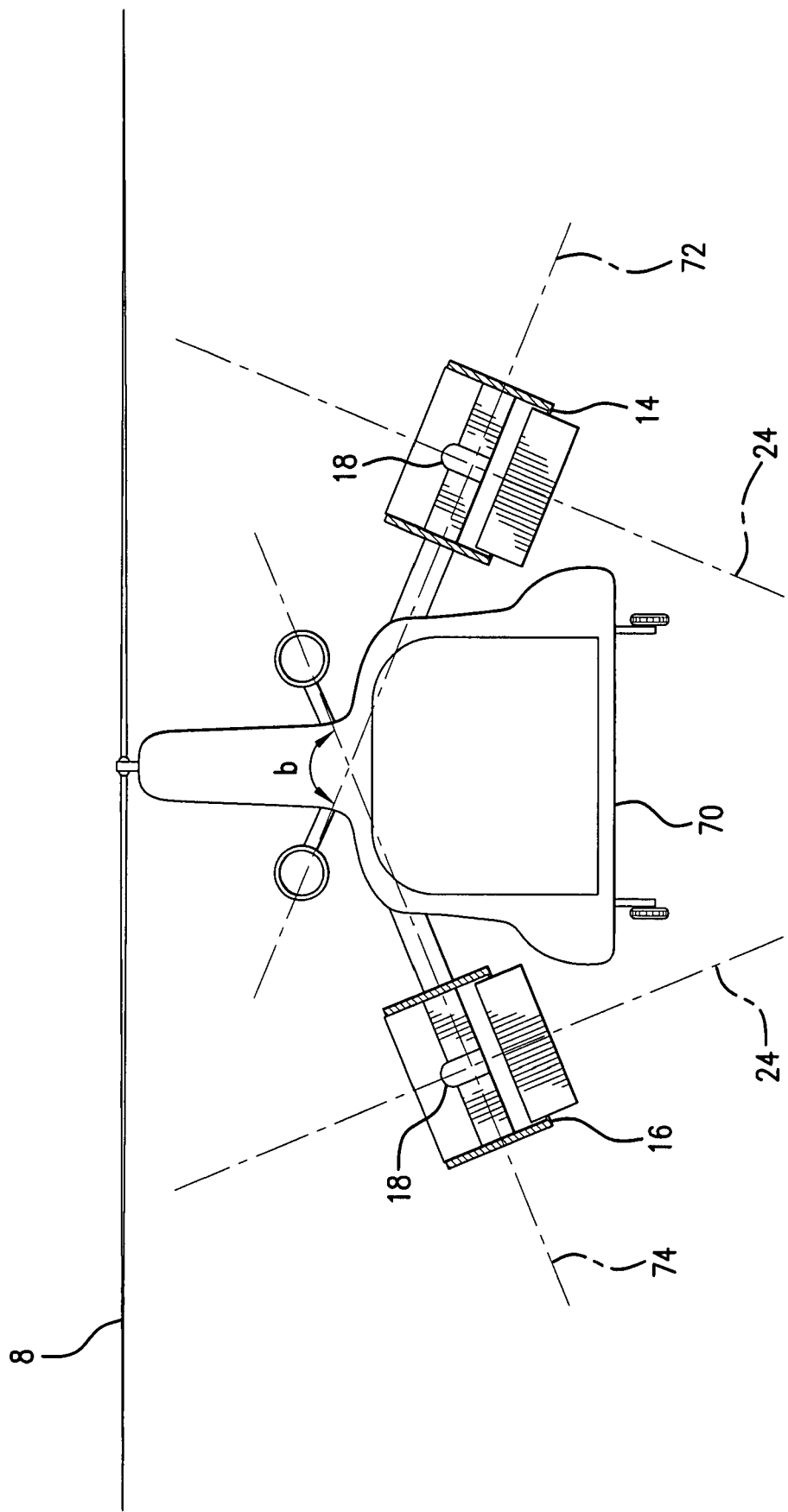
FIG. 19 is schematic partial cutaway view of a Boeing CH-47 Chinook helicopter equipped with the Invention.

In a specific application of the Invention and as illustrated by FIGS. 18 and 19, a Boeing CH-47 Chinook tandem rotor helicopter 70 may be equipped with the vectored thrusters 14, 16 of the Invention. Due to the configuration of the power transmission system of the Chinook 70, the port vectored thruster 14 is configured to rotate about a port thruster axis 72 between the first and second positions of the port vectored thruster 14. The starboard vectored thruster 16 is configured to rotate simultaneously about a separate starboard thruster axis 74 between the first and second positions. When viewed along the longitudinal axis of the helicopter 2 from the front, as shown by FIG. 19, the starboard thruster axis 74 and the port thruster axis 72 intersect at a shallow angle 'b.' The purpose of the separate port thruster axis 72 and starboard thruster axis 74 is to better receive power from the Chinook 70 power transmission system while providing the maximum interior space within the helicopter 2.

As shown by FIGS. 18 and 19, the shallow angle 'b' between the port thruster axis 72 and the starboard thruster axis 74 of the Chinook 70 results in the propeller axes of rotation 24 of the port and starboard vectored thrusters 14, 16 not being parallel when the port and starboard vectored thrusters 14, 16 are in the second position.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

We claim:

1. A rotary wing aircraft, the rotary wing aircraft comprising:
   a. a fuselage, said fuselage having a longitudinal axis;
   b. an engine attached to said fuselage;
   c. at least one rotor connected to said fuselage and adapted for rotation, said at least one rotor having a selectable cyclic pitch and a selectable collective pitch, said at least one rotor being operatively connected to said engine, said at least one rotor being configured to apply selectably a lift to said fuselage;
   d. at least two vectored thrusters, said at least two vectored thrusters being arrayed in a spaced-apart relation on opposing sides of said fuselage generally transverse to said longitudinal axis, said at least two vectored thrusters being operably connected to said engine, said at least two vectored thrusters having a selectable tilt, said selectable tilt of said at least two vectored thrusters defining a first position and a second position with respect to said fuselage, each of said at least two vectored thrusters having a propeller, each said propeller having a propeller axis of rotation, said propeller axis of rotation of each of said vectored thrusters being oriented generally parallel to said fuselage longitudinal axis when each said vectored thruster is in said first position.

2. The rotary-wing aircraft of claim 1 wherein said propeller axis of rotation for each said vectored thruster being oriented in a generally vertical direction when said at least two vectored thrusters are in said second position and the rotary-wing aircraft is in coordinated, level flight.

3. The rotary-wing aircraft of claim 1 wherein said at least two vectored thrusters comprise: a port vectored thruster and a starboard vectored thruster, said selectable tilt of said at least two vectored thrusters comprising: said port vectored thruster being configured to tilt generally about said port vectored thruster axis between said first and said second positions, said starboard vectored thruster being configured to tilt degrees about a starboard vectored thruster axis between said first and said second positions, said port vectored thruster axis and said starboard vector thruster axis together defining an angle thereinbetween in a projection along said longitudinal axis, said angle being greater than 90 degrees.

4. The rotary-wing aircraft of claim 3 wherein said selectable tilt for said at least two vectored thrusters further defines a plurality of vectored thruster positions intermediate to said first position and said second position.

5. The rotary-wing aircraft of claim 4, further comprising:
   a. a sensor, said sensor detecting a flight condition;
   b. a control system, said control system being configured to determine said tilt of said at least two vectored thrusters based on said flight condition detected by said sensor.

6. The rotary-wing aircraft of claim 5 wherein said propeller of each of said vectored thrusters has a selectable pitch, said control system being programmed to select said pitch of said propeller of each said vectored thruster based on said flight condition of the rotary-wing aircraft, said pitch of said propeller of a one said vectored thruster being differentially selectable from said pitch of said propeller of the other said vectored thruster.

7. The rotary-wing aircraft of claim 6 wherein said at least two vectored thrusters each has an exhaust having a direction of air flow, the rotary-wing aircraft further comprising: at least one vane associated with each said vectored thruster, said at least one vane being positioned in the exhaust of said vectored thruster with which said at least one vane is associated, said at least one vane having a vane angle with respect to said axis of rotation of said thruster propeller of said vectored thruster with which said at least one vane is associated, said vane angle of said at least one vane being movable to select a direction of flow of said exhaust of said vectored thruster, said control system being operably connected to each said vane, said control system being configured to adjust differentially said vane angle for each said vectored thruster to select a direction of flow of said exhaust of each said vectored thruster, said control system being programmed to select said adjustment of said vane angle based on said flight condition.

8. The rotary-wing aircraft of claim 7, said movable vane angle comprising: each said vane being selectably rotatable about a vane axis, each said vane axis being generally transverse to said longitudinal axis.

9. The rotary aircraft of claim 7, said control system comprising:
   a. a microprocessor, said sensor being operably connected to said microprocessor, said microprocessor being configured to receive said flight condition from said sensor;
   c. a computer memory accessible to said microprocessor;
   d. a database stored within said computer memory, said flight condition being a one of a plurality of said flight conditions, said database storing said plurality of said flight conditions, said database storing a plurality of combinations of vectored thruster control settings, a one of said plurality of combinations of said vectored thruster control settings being stored in association with each of said plurality of flight conditions, said microprocessor being programmed to select said one of said plurality of combinations of vectored thruster control settings corresponding to said flight condition received by said microprocessor from said sensor;
   e. a plurality of actuators, said plurality of actuators being configured to receive said selected one of said plurality of combinations of vectored thruster control settings from said microprocessor, said plurality of actuators being configured to implement said selected one of said plurality of combinations of vectored thruster control settings.

10. The rotary aircraft of claim 9, each of said plurality of vectored thruster control settings comprising: said vectored thruster tilt, said thruster propeller pitch for each said vectored thruster and said vane angle for each said vectored thruster.

11. The rotary aircraft of claim 10 wherein each of said at least two vectored thrusters has an inlet and wherein said sensor comprises a plurality of said sensors, said flight condition comprises a combination of conditions detected by said plurality of sensors, said combination of conditions detected by said plurality of sensors comprising:
   a. a torque available from said engine;
   b. a local airspeed and air flow direction at a one of said inlets of said at least two vectored thrusters.

12. The rotary aircraft of claim 11, said combination of conditions detected by said plurality of sensors further comprising:
   a. an angle of attack of the rotary aircraft;
   b. a cyclic and a collective pitch control positions;
   c. a total airspeed.

13. The rotary-wing aircraft of claim 11 wherein said control system is programmed to apply a control law in selecting said vectored thruster tilt of said at least two vectored thrusters, said propeller pitch for each said vectored thruster and said vane angle for each said vectored thruster.

14. The rotary aircraft of claim 11 wherein said rotary aircraft is a tandem-rotor helicopter.

15. A tandem-rotor helicopter, the tandem-rotor helicopter comprising:
   a. a fuselage, said fuselage having a longitudinal axis;
   b. an engine attached to said fuselage;
   c. two rotors connected to said fuselage and adapted for rotation, said two rotors each having a separately selectable cyclic pitch and a separately selectable collective pitch, said two rotors being operatively connected to said engine, said two rotor being configured to apply selectably a lift to said fuselage;
   c. a port vectored thruster and a starboard vectored thruster, said port and said starboard vectored thrusters being arrayed in a spaced-apart relation on opposing sides of said fuselage, said port vectored thruster having a selectable tilt about a port vectored thruster axis, said port vectored thruster axis falling on a first plane generally normal to said longitudinal axis, said starboard vectored thruster having a selectable tilt about a starboard vectored thruster axis, said starboard vectored thruster axis falling on a plane generally normal to said longitudinal axis, said port and said starboard thruster axes defining an angle thereinbetween when viewed along said longitudinal axis, said angle being greater than 90 degrees, said selectable tilt of said port and said starboard vectored thrusters defining a first position and a second position with respect to said fuselage, each of said port and said starboard vectored thrusters having a propeller adapted for rotation and operably connected to said engine, each said propeller having a propeller axis of rotation, said propeller axis of rotation of each of said port and said starboard vectored thrusters being oriented generally parallel to said fuselage longitudinal axis when said port and said starboard vectored thrusters are in said first position;
   d. at least two exhaust vanes, at least one of said exhaust vanes being located in an exhaust of each of said two thrusters, each said exhaust vane having a selectable vane angle with respect to said thruster propeller axis of rotation, said vane angle of a one said vectored thruster being separately selectable from said vane angle of the other said vectored thruster.

16. The tandem-rotor helicopter of claim 15, wherein said selectable tilt of said port and said starboard vectored thrusters has a range of said selectable tilt between said first position and said second position, said range of said tilt being generally 90 degrees, said port and said starboard vectored thrusters having a plurality of intermediate positions between said first and said second positions.

17. The tandem-rotor helicopter of claim 16 wherein each said propeller has a propeller pitch, said propeller pitch being separately selectable for said port vectored thruster and said starboard vectored thruster.

18. The tandem-rotor helicopter of claim 17, the helicopter further comprising:
   a. a control system, said control system being configured to select a vectored thruster control setting based on a flight condition of the tandem-rotor helicopter, said vectored thruster control setting comprising a combination of said vectored thruster tilt, said propeller pitch for each said vectored thruster, and said vane angle for each said vectored thruster;
   b. a plurality of actuators connected to said control system, said plurality of actuators being configured to implement said selected vectored thruster control setting.

19. The tandem-rotor helicopter of claim 18 wherein said control system further comprises:
   a. a plurality of sensors, said plurality of sensors being configured to detect said flight condition of the tandem-rotor helicopter;
   b. a microprocessor operably connected to said plurality of said sensors, said microprocessor being configured to receive said flight condition from said plurality of sensors;
   c. a computer memory accessible to said microprocessor;
   d. a database stored within said computer memory, said flight condition being a one of a plurality of said flight conditions, said database storing said plurality of said flight conditions, said database storing a plurality of vectored thruster control settings, a one of said plurality of vectored thruster control settings being stored in association with each of said plurality of flight conditions, said selecting of said vectored thruster control settings by said control system based on said flight condition comprising said control system being programmed to select said one of said plurality of vectored thruster control settings corresponding to said flight condition received by said microprocessor from said plurality of sensors.

20. The tandem-rotor helicopter of claim 19, said flight condition comprising a plurality of flight conditions detected by said plurality of sensors, said plurality of flight conditions detected by said plurality of sensors comprising:
   a. a torque available from said engine;
   b. an angle of attack of the rotary aircraft;
   c. a cyclic and a collective pitch control positions;
   d. a total airspeed; and
   e. a vectored thruster inlet airspeed and direction of vectored thruster inlet air flow.

* * * * *